United States Patent
Keating

(10) Patent No.: US 11,288,092 B2
(45) Date of Patent: Mar. 29, 2022

(54) DYNAMICALLY ADJUSTING RECONCILIATION TIME-DELAYS

(71) Applicant: Red Hat, Inc., Raleigh, NC (US)

(72) Inventor: Aiden Keating, Enniscorthy (IE)

(73) Assignee: Red Hat, Inc., Raleigh, NC (US)

(*) Notice: Subject to any disclaimer, the term of this patent is extended or adjusted under 35 U.S.C. 154(b) by 65 days.

(21) Appl. No.: 16/932,927

(22) Filed: Jul. 20, 2020

(65) Prior Publication Data

US 2022/0019460 A1 Jan. 20, 2022

(51) Int. Cl.
*G06F 9/46* (2006.01)
*G06F 9/48* (2006.01)

(52) U.S. Cl.
CPC .................................. *G06F 9/485* (2013.01)

(58) Field of Classification Search
CPC ....................................................... G06F 9/485
See application file for complete search history.

(56) References Cited

U.S. PATENT DOCUMENTS

| | | | | |
|---|---|---|---|---|
| 8,719,828 B2 * | 5/2014 | Lewis | ................... | G06F 9/4881 718/102 |
| 9,262,736 B2 | 2/2016 | Bassin et al. | | |
| 9,419,917 B2 | 8/2016 | Eaton et al. | | |

OTHER PUBLICATIONS

Dettori, P., et al., "Simplify the Lifecycle Management Process for your Kubernetes Apps with Operators," IBM, Aug. 1, 2019, https://developer.ibm.com/technologies/containers/tutorials/simplify-lifecycle-management-kubernetes-openshift-ibm-cloud-operator/.

Dobies, J., et al., "Kubernetes Operators—Automating the Container Orchestration Platform," O'Reilly Media, Inc., 2020, https://www.redhat.com/cms/managed-files/cl-oreilly-kubernetes-operators-ebook-f21452-202001-en_2.pdf.

Fraz, F., "Oracle Identity Manager 11gR2 Reconciliation Events Processing," Oracle, Apr. 2013, https://www.oracle.com/technical-resources/articles/middleware/idm-fraz-oim-reconciliation.html.

Philips, B., "Introducing the Operator Framework: Building Apps on Kubernetes," Red Hat, Inc., May 1, 2018, https://www.redhat.com/en/blog/introducing-operator-framework-building-apps-kubernetes.

"Getting Started with the Operator SDK," Red Hat, Inc., 2020, https://docs.openshift.com/container-platform/4.1/applications/operator_sdk/osdk-getting-started.html.

* cited by examiner

*Primary Examiner* — Camquy Truong
(74) *Attorney, Agent, or Firm* — Kilpatrick Townsend & Stockton LLP

(57) ABSTRACT

Time delays used in a reconciliation process can be dynamically adjusted. For example, a system can receive a request from a client for a time delay value. The time delay value can be a timespan in which to wait between a first execution and a second execution of reconciliation software. The request can indicate a result of the first execution. In response to receiving the request, the system can select an algorithm from among a group of algorithms based on the result of the first execution. The system can then determine the time delay value by executing the algorithm. The system can transmit the time delay value to the client, which can wait for the timespan prior to initiating the second execution of the reconciliation software.

20 Claims, 4 Drawing Sheets

United States Patent US 11,288,092 B2

DYNAMICALLY ADJUSTING RECONCILIATION TIME-DELAYS

TECHNICAL FIELD

The present disclosure relates generally to reconciliation of software states. More specifically, but not by way of limitation, this disclosure relates to dynamically adjusting time delays used in a reconciliation process for reconciling software states.

BACKGROUND

It has become increasingly common for computing environments to include automation software to automate various repeatable tasks. An example of automation software is container orchestration software like Kubernetes. Container orchestration software can automate the deployment, scaling, and management of software items (e.g., applications and services) inside containers to significantly reduce the workloads of users.

One type of repeatable task that is often automated via automation software is state reconciliation. State reconciliation (or "reconciliation") involves monitoring the current state of a software item to determine if the current state matches a predesignated target state, which may be preset by a user. If not, the automation system can adjust the current state of the software item to match the predesignated target state. This process can be iterated continuously to conform the software item's state to policy specifications and minimize state drift.

In the context of a Kubernetes environment (a computing environment running Kubernetes), an operator service can assist with state reconciliation and other automation tasks. An operator service is a software extension to Kubernetes that can make use of custom resources to manage software items and their components. A custom resource is an extension of the Kubernetes API. Operator services can act as controllers for custom resources, allowing for the easy automation of repeatable tasks such as application deployment, restoring application backups, state reconciliation, handling upgrades of application code, and so on.

DETAILED DESCRIPTION

Figure 1:
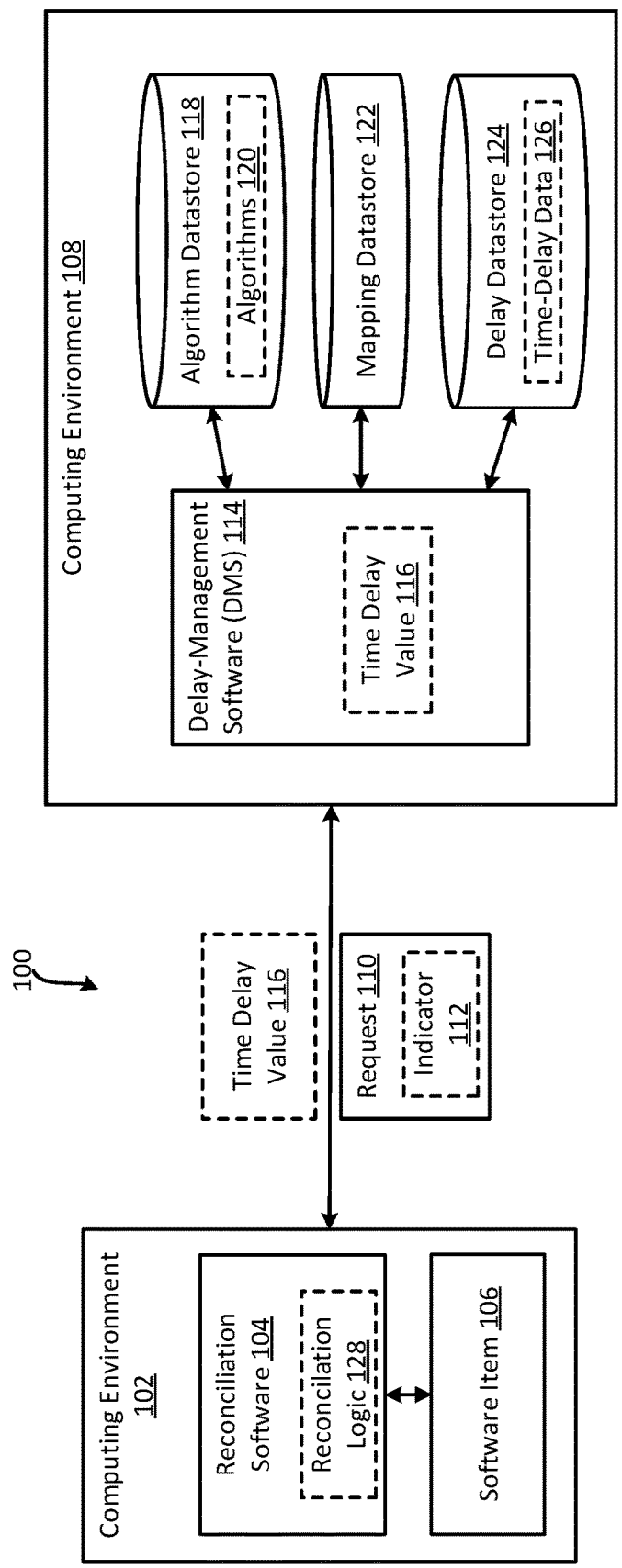
FIG. 1 is a block diagram of an example of a system for dynamically adjusting reconciliation time-delays according to some aspects of the present disclosure.

Some computing environments include reconciliation software for adjusting the current state of a software item to match a predesignated target state. For example, Kubernetes environments can run operator services that can periodically compare a target desired state for a software item against the software item's actual state to identify discrepancies between the two. The operator service can then interact with the Kubernetes API to make any necessary adjustments to keep the two in synch. The reconciliation software can run repeatedly in a loop in which successive executions of the reconciliation software (e.g., reconciliation logic therein) are separated by a time delay.

Conventionally, the time delay between successive executions (referred to herein as "first" and "second" executions to distinguish them from one another) of the reconciliation software is of a static length, which is preprogrammed into the reconciliation software. The static nature of the time delay can reduce the flexibility and responsiveness of the system. For example, the first execution of the reconciliation software may fail for any number of reasons, such that it may not be appropriate to use the same time delay between the first execution and the second execution in every case. Some failures may warrant longer time delays while other failures may warrant shorter time delays. Thus, using the same time delay regardless of the failure reason may negatively impact performance. Additionally, the fact that these static time delays are preprogrammed into the reconciliation software reduces the scalability and the portability of the reconciliation software. For example, it may be challenging to migrate a piece of reconciliation software developed using one framework, such as from the Kubernetes Ansible Operator framework, to another framework, such as the Kubernetes Go Operator framework, due to feature differences between these frameworks.

Some examples of the present disclosure can overcome one or more of the abovementioned problems by providing delay-management software (DMS) that is separate from reconciliation software and that can dynamically determine time-delay values for the reconciliation software based on various factors. As one example, the DMS can receive a request from the reconciliation software for a time delay value, where the time delay value corresponds to a delay timespan in which to wait between first and second executions of the reconciliation software. The request can indicate a result of the first execution. In response to receiving the request, the DMS can dynamically determine the time delay value by selecting an algorithm from a group of algorithms based on the result of the first execution. Selecting the algorithm based on the result from the first execution can allow for different results to yield different time-delay values. In some examples, the algorithm can also take into account other factors to produce time delay values that are more informed. For example, the algorithm can determine the time delay value based on one or more prior time-delay values that were previously generated in response to prior requests, so that prior time-delay values can inform future time-delay values. The DMS can execute the algorithm to determine the time delay value and transmit the time delay value back to the reconciliation software. In this way, the flexibility and granularity with which time delay values are determined is improved. The separation between the DMS and the reconciliation software can also improve the portability of the reconciliation software between frameworks and systems, since the reconciliation software need not have the functionality implemented by the DMS.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example of a system 100 for dynamically adjusting reconciliation time-delays according to some aspects of the present disclosure. The system 100 includes a computing environment 102. An example of the computing environment 102 can include a distributed computing environment, such as a grid computing system, a computing cluster, and a cloud computing system. The computing environment 102 can include reconciliation software 104 with reconciliation logic 128 for implementing a reconciliation loop in relation to a software item 106. The reconciliation loop can involve determining if the current state of the software item 106 matches a predesignated target state. If the current state of the software item 106 does not match the predesignated target state, the reconciliation software 104 can interact with the software item 106 or the computing environment 102, such as an application programming interface (API) of the computing environment 102, to attempt to adjust the current state of the software item 106 to match the predesignated target state. The reconciliation software 104 can repeat this reconciliation loop any number of times during the lifecycle of the software item 106.

In some examples, the reconciliation software 104 may attempt to adjust the current state of the software item 106 to match the predesignated target state, and the attempt may be successful. The reconciliation software 104 may then wait for a timespan before restarting the reconciliation loop over again. In other examples, the reconciliation software 104 may attempt to adjust the current state of the software item 106 to match the predesignated target state, but the attempt may fail. The attempt may fail for a variety of reasons, such as an intermittent problem with an API with which the reconciliation software 104 interacts to effectuate the adjustment. If the attempt fails, the reconciliation software 104 may wait for a timespan and then retry to adjust the current state of the software item 106 to match the predesignated target state. The reconciliation software 104 can iterate this process until the reconciliation software 104 is successful or until a predefined stopping criterion is met. Either way, the reconciliation software 104 may then wait for a timespan before restarting the reconciliation loop over again. Any of the abovementioned timespans can be referred to herein as a time delay. In particular, a time delay is a timespan in which to wait after completing one execution of the reconciliation software 104 before initiating the next execution of the reconciliation software 104.

In some examples, the respective time delay between each set of successive executions of the reconciliation software 104 can be determined dynamically (e.g., on-the-fly rather than preprogrammed) and change depending on the circumstances. For example, the time delay between first and second executions of the reconciliation software 104 can be dynamically determined to be different from another time delay between second and third executions of the reconciliation software 104. Likewise, the time delay between third and fourth executions of the reconciliation software 104 can be dynamically determined to be different from another time delay between fourth and fifth executions of the reconciliation software 104. And so on.

To determine a time delay between successive executions of the reconciliation software 104 (e.g., successive executions of the reconciliation logic 128 therein), the computing environment 102 can request a time delay value from another computing environment 108, which may or may not be a distributed computing environment. The other computing environment 108 can then determine the time delay value and return it to the computing environment 102. In this arrangement, the computing environment 102 or the reconciliation software 104 can act as a client, and the computing environment 108 can act as a server, collectively forming a client-server architecture.

More specifically, the computing environment 102 can transmit a request 110 for a time delay value 116 to the other computing environment 108. The request 110 may or may not originate from the reconciliation software 104. The request 110 can include an indicator 112 of a result of the most recent (in time) execution of the reconciliation software 104. The indicator 112 can be a unique identifier of the result, with different result indicators designating different results. The other computing environment 108 can receive the request 110 and execute delay-management software (DMS) 114 in response to the request 110. The DMS 114 can determine the time delay value 116 and transmit the time delay value 116 back to the originating computing environment 102, which may pass the time delay value 116 back to the reconciliation software 104. The reconciliation software 104 can then wait for a timespan corresponding to the time delay value 116 prior to initiating the next execution of its reconciliation logic 128. This process can be repeated for multiple time delays between multiple sets of successive executions of the reconciliation logic 128. By decoupling the reconciliation software 104 from the underlying algorithm used to generate the time delay value 116 in this way, the reconciliation software 104 need not have any knowledge of the algorithm. This can avoid having to modify the reconciliation software 104 to allow the reconciliation software 104 to dynamically determine time-delay values, which can improve the portability of the reconciliation software 104 and simplify maintenance of the reconciliation software 104.

In some examples, the DMS 114 can determine the time delay value 116 by selecting an algorithm from among a group of algorithms based on the result indicator 112 in the request 110. For example, the computing environment 108 can include an algorithm datastore 118 that includes multiple algorithms 120 mapped to unique identifiers of the algorithms, referred to herein as algorithm unique identifiers (AUIs). The algorithms 120 can be different from one another but may have a common set of input parameters. The computing environment 108 can also include mapping datastore 122 that correlates AUIs to result indicators. The DMS 114 can access the mapping datastore 122 to determine a particular AUI corresponding to the result indicator 112 in the request 110, and then access the algorithm datastore 118 to determine the algorithm corresponding to the particular AUI. Having determined the algorithm, the DMS 114 can execute the algorithm to determine the time delay value 116. The DMS 114 can then transmit the time delay value 116 back to the computing environment 102.

In some examples, the DMS 114 can store the determined time-delay value 116, along with input parameters provided to the selected algorithm for generating the time delay value 116, in a delay datastore 124. This information can be referred to as time-delay data 126. The DMS 114 can store time-delay data 226 in the delay datastore 124 each time the DMS 114 determines a time delay value in response to a request from a client. In this way, the delay datastore 124 can build up relationships between (i) a unique identifier of a given client, (ii) one or more prior time-delay values that were previously determined for the client, and (iii) algorithm parameters that were fed into one or more algorithms to generate the one or more prior time-delay values. The delay datastore 124 can store such time-delay data 226 for each unique client served by the computing environment 108. This can allow for information about previous invocations of a given algorithm, based on previous requests from a given client, to inform future invocations of the algorithm for that client.

For example, the DMS 114 can receive the request 110 from a client, such as the reconciliation software 104. The DMS 114 can respond to the request by retrieving time-delay data 226 associated with a unique identifier of the client from the delay datastore 124. The DMS 114 can then pass that time-delay data 226 as one or more input parameters to the selected algorithm to determine the time delay value 116. By allowing the algorithm to determine the time delay value 116 based on prior time-delay values (generated in response to prior requests from the client), the algorithm can adapt or learn over time. The DMS 114 can then transmit the determined time-delay value 116 back to the client.

Although FIG. 1 depicts a certain number and arrangement of components, it will be appreciated that other examples can involve more components, fewer components, different components, or a different arrangement of the components shown in FIG. 1. For example, the computing environment 102 may include multiple instances of reconciliation software 104, with each instance monitoring a respective software item. In some such examples, each instance of the reconciliation software 104 can act as a unique client in interactions with the other computing environment 108, despite the fact that all of the instances are running in the same computing environment 102.

Figure 2:
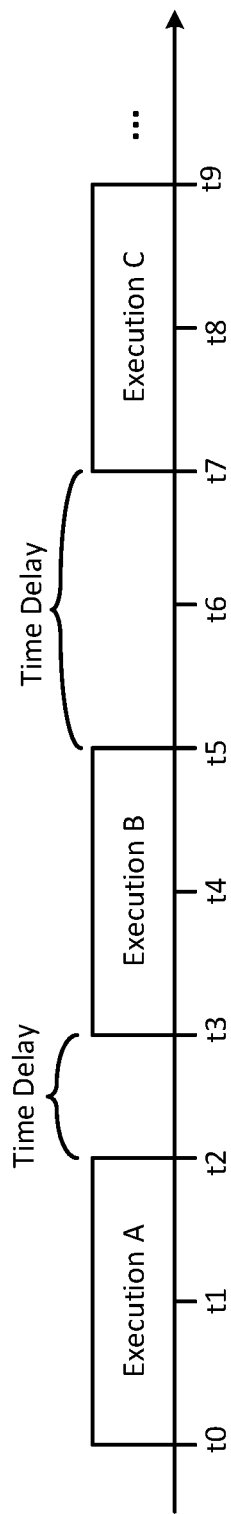
FIG. 2 is a block diagram of an example of time delays between successive executions of reconciliation software according to some examples of the present disclosure.

FIG. 2 is a block diagram of an example of time delays between successive executions of reconciliation software according to some examples of the present disclosure. In this example, there are three executions of the reconciliation software—Execution A, Execution B, and Execution C. Execution A starts at time t0 and extends to time t2. Execution B starts at time t3 and extends to time t5. And Execution C starts at time t7 and extends to time t9. There are time delays between each set of successive executions, e.g., between Execution A and Execution B, and between Execution B and Execution C. The first time delay between Execution A and Execution B is roughly half the length of the second time delay between Execution B and Execution C. Such time delays can be determined dynamically according to some examples of the present disclosure, for example by implementing the processes described above in relation to FIG. 1.

Figure 3:
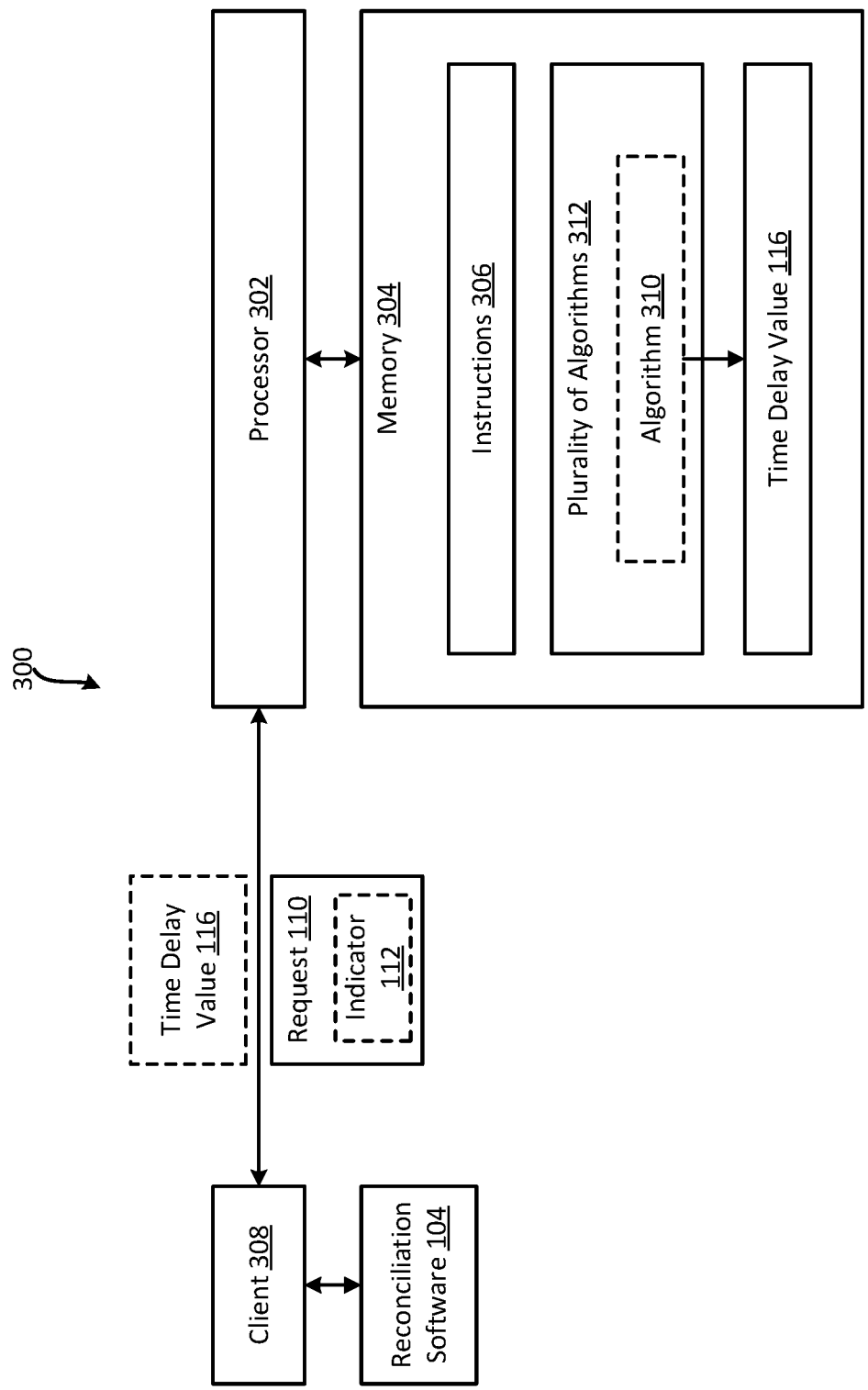
FIG. 3 is a block diagram of another example of a system for dynamically adjusting reconciliation time-delays according to some aspects.

FIG. 3 is a block diagram of another example of a system 300 for dynamically adjusting reconciliation time-delays according to some aspects. The system 300 includes a processor 302 communicatively coupled to a memory 304. The processor 302 and the memory 304 may be located in a common housing of a computing device or distributed from one another.

The processor 302 can include one processor or multiple processors. Non-limiting examples of the processor 302 include a Field-Programmable Gate Array (FPGA), an application-specific integrated circuit (ASIC), a microprocessor, etc. The processor 302 can execute instructions 306 stored in the memory 304 to perform operations. For example, the instructions 306 can include program code for some or all of the delay-management software (DMS) described above, and the processor 302 can execute the instructions 306 to perform some or all of the operations described above in relation to the DMS. The instructions 306 may include processor-specific instructions generated by a compiler or an interpreter from code written in any suitable computer-programming language, such as C, C++, C#, etc.

The memory 304 can include one memory device or multiple memory devices. The memory 304 can be non-volatile and may include any type of memory device that retains stored information when powered off. Non-limiting examples of the memory 304 include electrically erasable and programmable read-only memory (EEPROM), flash memory, or any other type of non-volatile memory. At least some of the memory device includes a non-transitory computer-readable medium. A non-transitory computer-readable medium can include electronic, optical, magnetic, or other storage devices capable of providing the processor 302 with the instructions 306 or other program code. Non-limiting examples of a non-transitory computer-readable medium include magnetic disk(s), memory chip(s), ROM, random-access memory (RAM), an ASIC, a configured processor, optical storage, or any other medium from which a computer processor can read the instructions 306.

In some examples, the processor 302 can receive a request 110 from a client 308 for a time delay value 116. The processor 302 can be remote from the client 308 and receive the request 110 via a network, such as a local area network (LAN) or the Internet. The time delay value 116 can be a timespan in which to wait between a first execution and a second execution of reconciliation software 104, which may be internal or external to the client 308. The request 110 can indicate a result of the first execution. For example, the request 110 can include an indicator 112 of the result.

In response to receiving the request 110, the processor 302 can select an algorithm 310 from a plurality of algorithms 312. The processor 302 can select the algorithm 310 based on the result of the first execution. The processor 302 can then determine the time delay value 116 by executing the algorithm 310. After determining the time delay value 116, the processor 302 can transmit the time delay value 116 to the client 308, for example over a network. The client 308 can be configured to receive the time delay value 116 and wait for the timespan prior to initiating the second execution of the reconciliation software 104.

Figure 4:
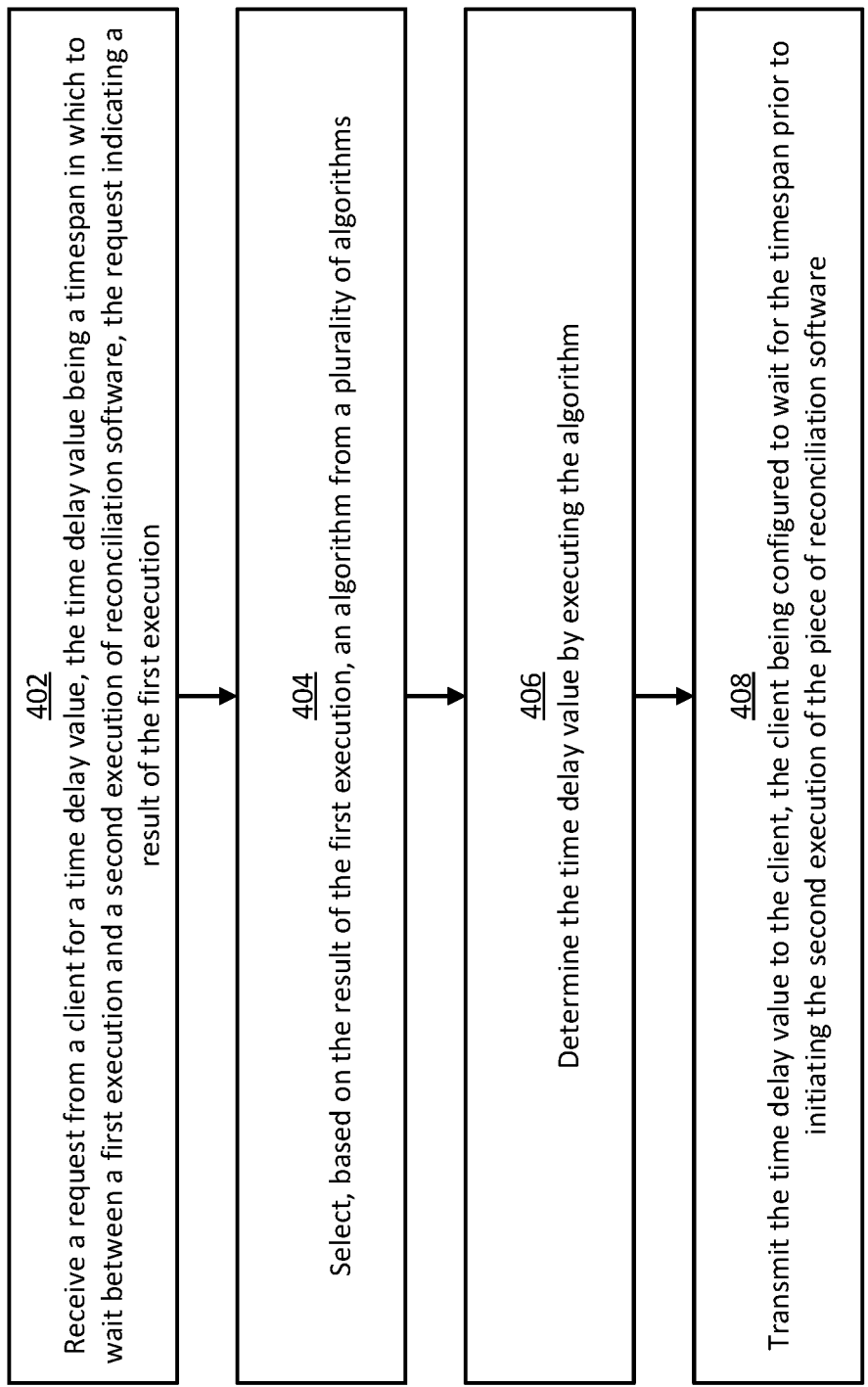
FIG. 4 a flow chart of an example of a process for dynamically adjusting reconciliation time-delays according to some aspects of the present disclosure.

In some examples, the processor 302 can implement some or all of the operations shown in FIG. 4. Other examples can involve more operations, fewer operations, different operations, or a different order of the operations than is depicted in FIG. 4. The operations of FIG. 4 are described below with reference to components of FIG. 3.

In block 402, the processor 302 receives a request 110 from a client 308 for a time delay value 116. The time delay value 116 can be a timespan in which to wait between a first execution and a second execution of reconciliation software 104. The request 110 can indicate a result of the first execution. For example, the request 110 can include an indicator 112 of the result.

In block 404, the processor 302 selects, based on the result of the first execution, an algorithm 310 from a plurality of algorithms 312. In some examples, the processor 302 can select the algorithm 310 based on a relationship in a mapping datastore between (i) an AUI for the algorithm 310 and (ii) the indicator 112 of the result. The processor 302 can select the algorithm 310 in response to receiving the request 110.

In block 406, the processor 302 determines the time delay value 116 by executing the algorithm 310. In some examples, the processor 302 can execute the algorithm 310 based on one or more prior time-delay values associated with prior requests from the client 308.

In block 408, the processor 302 transmits the time delay value 116 to the client 308. The client 308 can receive the time delay value 116 and wait for the timespan prior to initiating the second execution of the reconciliation software 104.

The above process can be iterated for each request received from the client 308. The client 308 may transmit such requests after each execution of the reconciliation software 104 to obtain a time delay value indicating a timespan in which to wait before some or all of the reconciliation software 104 is to be executed again.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, examples described herein can be combined together to yield still further examples.

The invention claimed is:

1. A system comprising:
a processor; and
a memory including instructions that are executable by the processor for causing the processor to:
receive a request from a client for a time delay value, the time delay value being a timespan in which to wait between a first execution and a second execution of reconciliation software, the request indicating a result of the first execution; and
in response to receiving the request:
select, based on the result of the first execution, an algorithm from a plurality of algorithms;
determine the time delay value by executing the algorithm; and
transmit the time delay value to the client, the client being configured to wait for the timespan prior to initiating the second execution of the reconciliation software.

2. The system of claim 1, wherein the memory further includes instructions that are executable by the processor for causing the processor to, in response to receiving the request:
access a datastore that includes relationships between (i) an identifier of the client and (ii) one or more previous time-delay values determined prior to receiving the request, the one or more previous time-delay values being determined using one or more algorithms among the plurality of algorithms; and
determine the time delay value by executing the algorithm based on the one or more previous time-delay values.

3. The system of claim 2, wherein the memory further includes instructions that are executable by the processor for causing the processor to, subsequent to determining the time delay value:
update the datastore to include a relationship between (i) the identifier of the client and (ii) the time delay value, for enabling the time delay value to be used in generating another time-delay value in response to another request that is received from the client.

4. The system of claim 1, wherein the reconciliation software is configured to adjust a current state of a software item in a computing environment to match a predesignated target state.

5. The system of claim 4, wherein the computing environment is a Kubernetes environment, the client is an operator service in the Kubernetes environment, and the software item is managed by the operator service.

6. The system of claim 1, wherein the memory further includes instructions that are executable by the processor for causing the processor to receive the request from the client over the Internet and transmit the time delay value to the client over the Internet.

7. The system of claim 1, wherein the plurality of algorithms are configured for determining time delay values between successive executions of the reconciliation software.

8. The system of claim 1, wherein the client includes the reconciliation software.

9. A method comprising:
receiving, by a processor, a request from a client for a time delay value, the time delay value being a timespan in which to wait between a first execution and a second execution of reconciliation software, the request indicating a result of the first execution; and
in response to receiving the request:
selecting, by the processor and based on the result of the first execution, an algorithm from a plurality of algorithms;
determining, by the processor, the time delay value by executing the algorithm; and
transmitting, by the processor, the time delay value to the client, the client being configured to wait for the timespan prior to initiating the second execution of the reconciliation software.

10. The method of claim 9, further comprising, in response to receiving the request:
accessing a datastore that includes relationships between (i) an identifier of the client and (ii) one or more previous time-delay values determined prior to receiving the request, the one or more previous time-delay values being determined using one or more algorithms among the plurality of algorithms; and
determining the time delay value by executing the algorithm based on the one or more previous time-delay values.

11. The method of claim 10, further comprising, subsequent to determining the time delay value:
updating the datastore to include a relationship between (i) the identifier of the client and (ii) the time delay value, for enabling the time delay value to be used in generating another time-delay value in response to another request that is received from the client.

12. The method of claim 10, wherein the reconciliation software is configured to adjust a current state of a software item in a computing environment to match a predesignated target state.

13. The method of claim 12, wherein the computing environment is a Kubernetes environment, the client is an operator service in the Kubernetes environment, and the software item is managed by the operator service.

14. The method of claim 10, further comprising receiving the request from the client over the Internet and transmitting the time delay value to the client over the Internet.

15. The method of claim 10, wherein the plurality of algorithms are configured for determining time delay values between successive executions of the reconciliation software.

16. The method of claim 10, wherein the client includes the reconciliation software.

17. A non-transitory computer-readable medium comprising program code that is executable by a processor for causing the processor to:
receive a request from a client for a time delay value, the time delay value being a timespan in which to wait between a first execution and a second execution of reconciliation software, the request indicating a result of the first execution; and in response to receiving the request:
   select, based on the result of the first execution, an algorithm from a plurality of algorithms;
   determine the time delay value by executing the algorithm; and
   transmit the time delay value to the client, the client being configured to wait for the timespan prior to initiating the second execution of the reconciliation software.

18. The non-transitory computer-readable medium of claim 17, further comprising program code that is executable by the processor for causing the processor to, in response to receiving the request:
   access a datastore that includes relationships between (i) an identifier of the client and (ii) one or more previous time-delay values determined prior to receiving the request using one or more algorithms among the plurality of algorithms; and
   determine the time delay value by executing the algorithm based on the one or more previous time-delay values.

19. The non-transitory computer-readable medium of claim 18, further comprising program code that is executable by the processor for causing the processor to, subsequent to determining the time delay value:
   update the datastore to include a relationship between (i) the identifier of the client and (ii) the time delay value, for enabling the time delay value to be used in generating another time-delay value in response to another request that is received from the client.

20. The non-transitory computer-readable medium of claim 17, wherein the reconciliation software is configured to adjust a current state of a software item in a computing environment to match a predesignated target state.

\* \* \* \* \*